March 23, 1943.  C. T. WEST ET AL  2,314,639
CEMENT SACK
Filed Dec. 17, 1938

Inventor
CARLETON T. WEST,
MICHAEL TRESHOW,
By
Attorney

Patented Mar. 23, 1943

2,314,639

UNITED STATES PATENT OFFICE 2,314,639

CEMENT SACK

Carleton T. West, Tehachapi, and Michael Treshow, West Los Angeles, Calif., assignors to Monolith Portland Cement Company, a corporation of Nevada Application December 17, 1938, Serial No. 246,404

3 Claims. (Cl. 150—1)

This invention relates generally to containers and particularly to containers such as sacks or bags for transporting loose material such as cement and the like.

The container of this invention is particularly designed for use in transporting dry cement, however it may be used for transporting other materials and particularly such loose materials as may be discharged into the container from storage bins. Cement is ordinarily transported in sacks which hold approximately 94 lbs. or less which are closed at both ends when filled.

The common cement sack is ordinarily manually handled during both filling and emptying and are carried by the workmen in loading and unloading operations. While such sacks are suitable for ordinary conditions, they are not suitable where large quantities of cement must be handled quickly as the time required for handling and the manual operations involved entail considerable expense. To merely enlarge the ordinary cement sack, to increase its capacity, will not successfully provide a means for handling large quantities of cement for the reason that the sacks would then be too large and heavy for manual handling in the emptying and filling operations and the loading and unloading of the sacks from cars and trucks and other forms of transportation.

It is a primary object of this invention to provide an improved container for use in transporting cement and the like where large quantities of cement must be quickly handled, it being a particular object to provide an improved container which will hold a relatively large quantity of cement, as for instance, approximately 1500 lbs., the container being particularly designed to be handled by mechanical means during the filling, loading and unloading and emptying operations with a minimum of manual manipulations during such operations.

It is a further object of this invention to provide for the transportation of cement an improved container so constructed that the filling operation may be quickly accomplished and the container readily emptied.

It is a further object of this invention to provide a container which is provided with internal supporting means to relieve the strain on the material of the bag, and to support the upper end of the bag in spaced relation with the lower end.

These and other objects will be apparent from the drawing and the following description.

Referring to the drawing, which is for illustrative purposes only—

Figure 1:
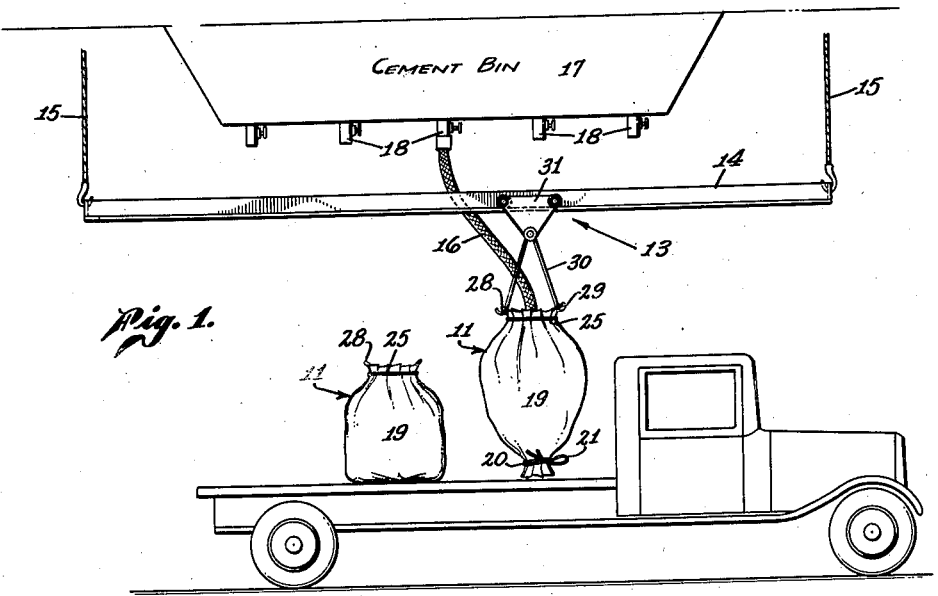
Fig. 1 is a diagrammatic elevation showing the container of this invention as it is used during the filling operation and the loading of the same for transportation.

More particularly describing the invention, reference numeral 11 generally indicates the container, the subject of this invention, in the form of a cement sack, such sack being shown in Fig. 1 during the filling operation and another sack deposited upon a truck for transportation. In Fig. 1, the sack being filled is shown suspended above the truck by a supporting apparatus generally indicated at 13, in the form of a track 14 suspended by cables 15 from an elevating mechanism not shown. 16 indicates a flexible pipe or tube from which the cement is discharged from a cement bin 17 provided with valved outlets 18.

Figures 2, 4:
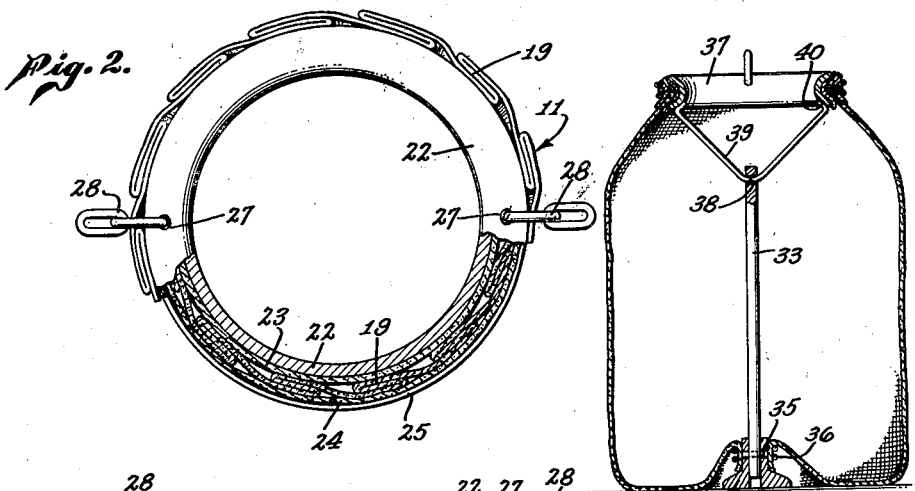
Fig. 2 is an enlarged top plan view, partly in section of the container illustrated in Fig. 1.
Fig. 4 is a sectional elevation of a form of container provided with internal supporting means.
Figure 3:
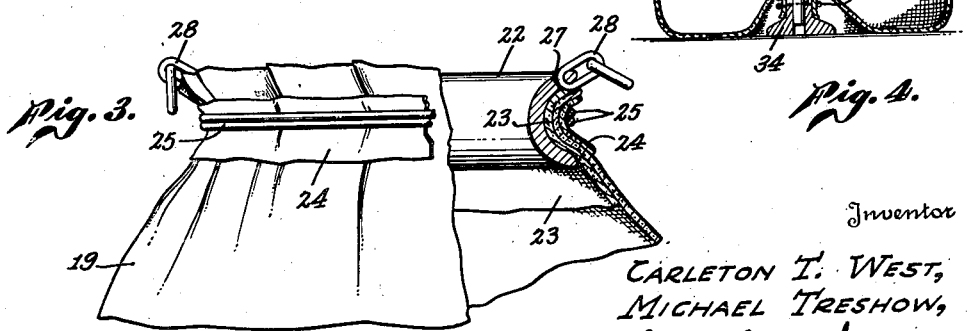
Fig. 3 is a fragmentary elevation, partly in section, of the containers shown in Figs. 1 and 2.

Referring to Figs. 2 and 3, of the drawing, the container comprises a substantially tubular body portion 19 of any suitable fabric, such as heavy canvas or the like, the lower end of which is gathered and closed by means of a cord or draw string 20 which is tied with a slip knot 21 so that the cord may be readily released and the bag opened at its lower end to discharge its contents merely by loosening the slip knot, such arrangement forming a releasable closure means for the container. The top of the container is open at all times and is provided with a circular metal ring 22 semi-circular in cross section, as particularly shown in Fig. 3, the curved outer edge of the ring having placed therearound a band 23 of webbing or canvas over which the upper end of the sack is gathered and extended, the band 23 extending downwardly over the lower edge of the ring 22 so that the material of the bag does not come into contact with the metal ring and become abraded thereby. Around the upper edge of the sack and on the outside thereof is placed an outer band 24 of webbing or canvas which is engaged by wires 25 which pass around such band and firmly clamp the upper end of the sack to the ring 22, the ends of the wire 25 being permanently secured to each other in any suitable manner. The ring 22 is provided with eyes 27 which when used with the apparatus shown receive the ends of links 28, such links affording means for engagement by hooks 29 formed on the ends of supporting rods 30 pivotally connected at their upper ends to a carriage 31 as shown in Fig. 1.

In operation the container having been elevated by the elevating mechanism, the bottom of the container having first been closed by the cord 20, the cement is discharged into the open upper end of the container while in its suspended position. After the container has been partially filled it is lowered until its lower end rests upon the body of the truck or other transportation means and the filling operation completed. In filling the container, as above described, it is approximately filled to three quarters of its capacity, the lowering of the container at such time to rest upon the transportation means is to relieve the container of undue strain and the more ready disposition of the container where desired. After the containers are deposited on the truck or other means of transportation a tarpaulin or other cover is placed over the open tops of the sacks. At the point of destination where it is desired to dump the cement, it is only necessary to elevate the container by any suitable elevating apparatus to the place desired where the container is discharged of its contents merely by loosening the slip knot.

In Fig. 4 is illustrated another form of the invention wherein supporting means is provided within the container to prevent excessive bulging of the same and to relieve the material of the container from excessive strain. In this form of the invention a rod or other suitable member 33 is provided within the sack which extends into a base member 34 and secured thereto by means of a pin 35. The base member is of substantial size at its lower end and forms a base or support for the sack structure. The lower end of the container is gathered around the reduced upper end of the base member and releasably secured thereto by cord 36. The upper end of the container is provided with a ring 37 to which the upper end of the container is secured in the same manner as described with respect to the sack shown in Figs. 1 to 3 inclusive. The upper end of the rod 33 is provided with an eye 38 through which extends a bail 39 the upper ends 40 of which are welded or otherwise secured to the ring 37. With this construction it is apparent that the rod 33 supports the base member 34 in spaced relation from the ring 37. This construction determines the spacing between the top of the container and the bottom and thereby supports the bottom of the sack directly from the ring and not by the material of the container when the sack is lifted. It also prevents excessive bulging when the sack is resting upon any supporting surface. The contents are discharged from this form of container by releasing the cord 36.

If desired particularly to relieve the strain on the sack material during lifting and lowering of the sack the rod 33 may be made in the form of a wire rope or similar construction thereby supporting the load largely from the ring.

It is to be noted that in both forms shown and described that the container is an open topped sack or the like which may be releasably opened at its lower end. It is to be understood that, while the invention has been shown and described with respect to the forms illustrated, the invention is not limited to such forms but includes within its scope such constructions as come fairly within the spirit of the appended claims.

We claim as our invention:

1. A container for transporting cement and the like comprising an open-ended sack; a metal ring secured in the upper end of the sack; a downwardly extending bail secured to said ring; a centrally disposed rod secured to said bail and having a base at its lower end; and means for releasably binding the lower end of the sack about said base.

2. A container for transporting cement or the like comprising an open-ended fabric sack; a metal ring secured in the upper end of the sack forming a permanent material receiving opening; supporting means for said sack fixed to said ring including a rigid rod extending longitudinally and centrally of said sack, said supporting means being secured at its upper end to said ring and being shorter than the length of the fabric forming said sack; a base member mounted on the lower end of said rod, said base member being substantially smaller than the sack; and releasable means securing the lower end of said sack together about said base member.

3. A container for transporting cement or the like comprising an open-ended fabric sack in the form of an elongated tube initially of substantially uniform diameter; a ring of less diameter than said sack, said ring having a substantially arcuate cross sectional shape with the inner surface convex and the outer surface concave; means securing the upper end of said sack to said ring thereby forming a permanent material receiving opening, the fabric material of the sack being gathered about said ring; means on said ring for receiving an elevating apparatus; and releasable means securing the gathered lower end of the sack to a position of closure.

CARLETON T. WEST.
MICHAEL TRESHOW.